United States Patent
Ling et al.

(10) Patent No.: US 12,345,807 B1
(45) Date of Patent: Jul. 1, 2025

(54) METHOD AND SYSTEM FOR EVALUATING ANTI-SKID PERFORMANCE OF AIRPORT PAVEMENT BASED ON SPACEBORNE SAR

(71) Applicant: TONGJI UNIVERSITY, Shanghai (CN)

(72) Inventors: Jianming Ling, Shanghai (CN); Yu Tian, Shanghai (CN); Hongduo Zhao, Shanghai (CN); Jingfu Chen, Shanghai (CN); Mintao Bao, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 19/036,668

(22) Filed: Jan. 24, 2025

(30) Foreign Application Priority Data

Dec. 28, 2023 (CN) .......................... 202311840831.5

(51) Int. Cl.
*G01S 13/90* (2006.01)
(52) U.S. Cl.
CPC ............................... *G01S 13/9021* (2019.05)
(58) Field of Classification Search
CPC .................................................. G01S 13/9021
See application file for complete search history.

(56) References Cited

U.S. PATENT DOCUMENTS

2014/0191900 A1* 7/2014 Uysal ................. G01S 13/9023
342/25 A

FOREIGN PATENT DOCUMENTS

CN 101887122 A * 11/2010
CN 117630933 A 3/2024

OTHER PUBLICATIONS

Notification to Grant Patent Right for Invention, Chinese Application No. 202311840831.5, mailed Aug. 22, 2024 (3 pages).
CNIPA, Office Action issued for Chinese Application No. 202311840831.5, mailed Aug. 8, 2024 (9 pages).
Arnab Muhuri et al., "Geodesic Distance Based Scattering Power Decomposition for Compact Polarimetric SAR Data", IEEE Transactions on Geoscience and Remote Sensing, vol. 61, No. 1-2, 31, Issued Date 2023.

* cited by examiner

*Primary Examiner* — Yoshihisa Ishizuka
(74) *Attorney, Agent, or Firm* — Daniel M. Cohn

(57) ABSTRACT

The present disclosure provides a method and system for evaluating anti-skid performance of airport pavement based on spaceborne SAR. the method obtains an echo intensity plot by processing SAR images; Establish a FNN model using machine learning algorithms that input objective conditions, surface texture parameters, measured friction coefficients, and output SAR echo intensity; Finally, input the SAR images to be predicted and the assumed friction coefficient into the FNN model, to compare and predict the anti-skid performance. The present disclosure is based on the properties of SAR echoes and establishes a correlation between SAR echo intensity and pavement friction coefficient in both temporal and spatial dimensions, enabling uninterrupted remote sensing monitoring of regional anti-skid performance over a long period and large spatial distribution.

3 Claims, 1 Drawing Sheet

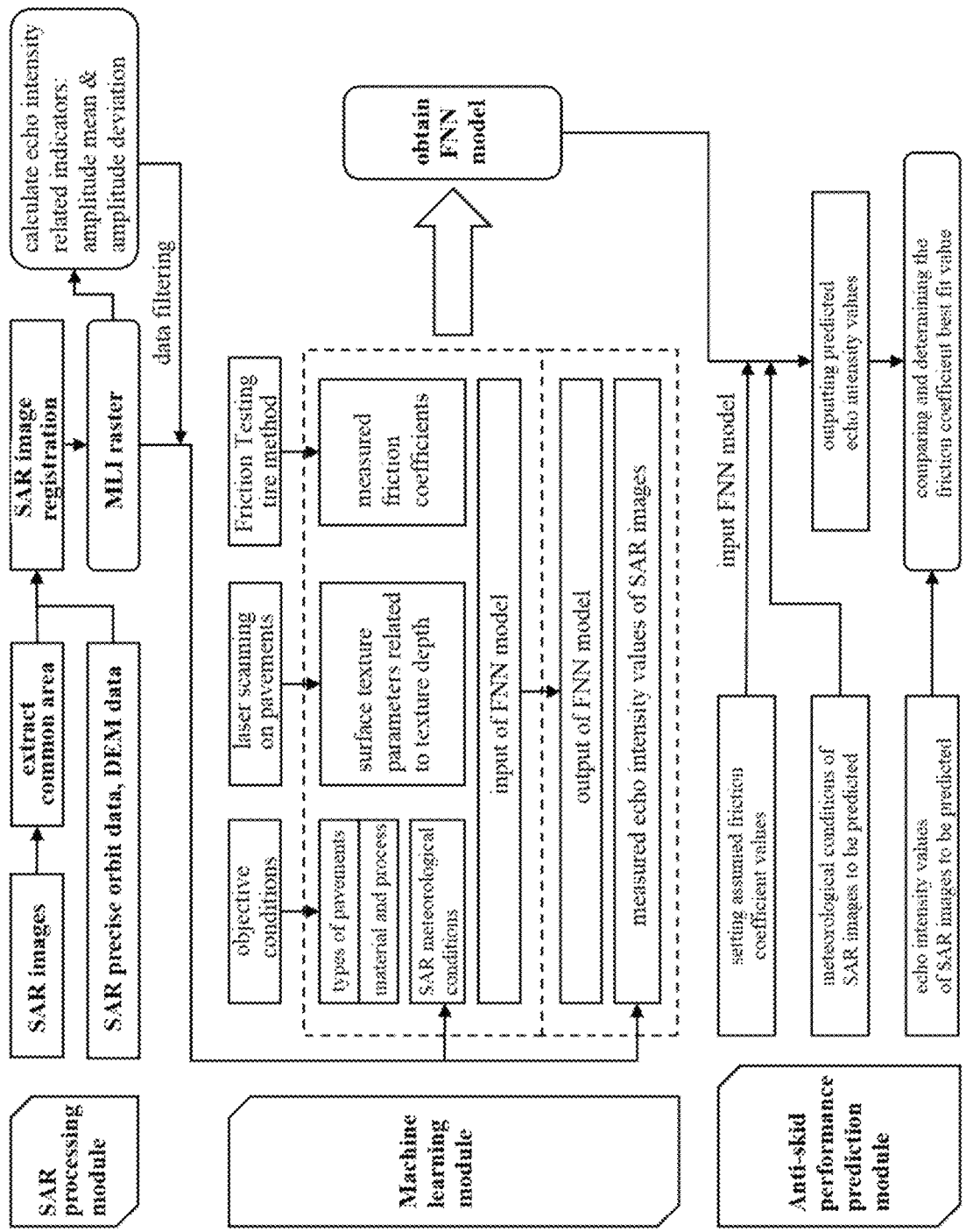

METHOD AND SYSTEM FOR EVALUATING ANTI-SKID PERFORMANCE OF AIRPORT PAVEMENT BASED ON SPACEBORNE SAR

CROSS-REFERENCE OF RELATED APPLICATIONS

This patent application claims the benefit and priority of Chinese Patent Application No. 202311840831.5 filed on Dec. 28, 2023, the disclosure of which is incorporated by reference herein in its entirety as part of the present application.

TECHNICAL FIELD

The present disclosure relates to the technical field of detecting the anti-skid performance of airport pavements, specifically to a method and system for evaluating anti-skid performance of airport pavement based on spaceborne SAR.

BACKGROUND

In recent years, China has vigorously promoted the construction of four characteristics airports, which has put forward higher requirements for monitoring the status of airport airside areas, such as the anti-skid performance of airport runways, which plays an important role in maintaining a stable state for aircraft during takeoff and landing. If the anti-skid performance cannot meet the prescribed requirements, it will bring safety hazards and affect the safety of aircraft takeoff and landing.

At present, the measurement methods mainly relying on manual labor and testing tire have problems such as small data coverage area, time-consuming and labor-intensive. In addition, the inspection also requires the closure of the airport, which affects the normal operation of flights and other issues, making it difficult to meet the requirements of current green airport and smart airport construction.

The airport pavements need to have appropriate friction characteristics to ensure the normal taxiing, takeoff, and landing of aircrafts. The friction characteristics can be characterized by texture depth and friction coefficient. The texture depth belongs to static evaluation, while the friction coefficient belongs to dynamic evaluation. Their applicability is slightly different, and static evaluation cannot evaluate the impact of situations such as road area water and pollution on friction characteristics. The quantitative evaluation of friction characteristics can be completed through fixed-point or continuous anti-skid performance testing in accordance with relevant standards and regulations in the field of highways and airports in China. Fixed-point test mainly includes British pendulum method and sand spreading method; Continuous test mainly includes Vehicle-mounted laser texture depth gauge, sidewalk force coefficient test method, dynamic rotating friction coefficient tester and Brake-type skid resistance device friction coefficient testing method.

Each of these methods has its advantages and disadvantages, still, they all have common shortcomings: they require suspending the normal operation of the testing area and can only test a partial area, making it difficult to achieve a comprehensive evaluation of the pavement status.

SUMMARY

In view of the problems in the prior art, the present disclosure provides a method and system for evaluating anti-skid performance of airport pavement based on spaceborne SAR. This method evaluates and predicts the anti-skid performance of airport pavement through remote sensing by establishing a correlation between spaceborne SAR echo intensity images and pavement anti-skid performance indicators.

The technical solution of the present disclosure is shown as follows:

A method for evaluating anti-skid performance of airport pavement based on spaceborne synthetic aperture radar, synthetic aperture radar, abbreviated as SAR, the method comprises following steps:

S1. basing on the SAR images and digital elevation model, obtaining a multi-look intensity raster image with echo intensity values corresponding to scatter points;

S2. select research sites, confirm types of pavements of the research sites, obtain pavement material data and pavement treatment process parameters, and perform laser scanning on the pavements to obtain surface texture parameters related to a texture depth and measured friction coefficients of the pavements;

S3. establishing and outputting a SAR image echo intensity feedforward neural network model;

S4. basing on the SAR image echo intensity feedforward neural network model, predict echo intensity values are obtained and compared numerically with echo intensity values of SAR images to be predicted, in order to determine a friction coefficient best fit value; basing on the friction coefficient best fit value, the anti-skid performance of airport pavement is evaluated.

In the above method, a step of obtaining a multi-look intensity raster image with echo intensity values corresponding to scatter points, comprises:

obtaining single look complex images and SAR precise orbit data through a SAR; extracting a common area and designating the research scopes; inputting SAR precision orbit data, and combining it with the digital elevation model for image registration to obtain a ground echo intensity scatter plot containing geographic coding and multiple SAR acquisition times; calculating echo intensity related indicators for each scatter point one by one, the echo intensity related indicators comprising amplitude mean and amplitude deviation; and selecting scatter points that meet screening conditions of amplitude mean and amplitude deviation; after filtering, finally, the ground echo intensity scatter plot is rasterized into a multi-look intensity raster image.

In the above method, a calculation method of amplitude mean is to calculate the arithmetic mean of multiple amplitude values for multiple SAR acquisition times of a scatter point;

a calculation expression for amplitude deviation is:

$$ADI = std(X)/mean(X),$$

wherein, X is the amplitude value, mean(X) is the amplitude mean, and std(X) is the amplitude standard deviation, which is the standard deviation of multiple amplitude values for multiple SAR acquisition times of a scatter point;

considering the scattering characteristics of common scatterers, a scatter points selection criteria range is: $0.25 \leq ADI \leq 0.8$.

In the above method, step S2 comprises the following sub-steps:

Select research sites based on the SAR images, confirm the types of pavements at the research sites, obtain pavement material data and pavement treatment process parameters for the research site;

Collecting feature data of pavement surface texture at research sites, and calculating surface texture parameters from the feature data. Surface texture parameters include texture depth, average slope, and average curvature radius; And measuring the measured friction coefficients of the research sites.

In the above method, step S3 comprises setting input indicators and output indicators;

Input indicators:

meteorological conditions at the time of SAR acquisition; types of pavements, pavement material data, pavement treatment process parameters, surface texture parameters and measured friction coefficients;

output indicator: echo intensity values corresponding to the research sites in the MLI raster, data of the input indicators and the output indicators is divided into a training set and a test set; the training set is machine-learned to obtain the SAR image echo intensity feedforward neural network model.

In the above method, step S4 comprises the following sub-steps:

obtaining echo intensity values of the SAR images to be predicted and corresponding meteorological conditions for SAR acquisition; setting assumed friction coefficient values, Inputting the echo intensity values of the SAR images to be predicted, the corresponding meteorological conditions, and the assumed friction coefficient values into the SAR image echo intensity feedforward neural network model to obtain predicted echo intensity values; calculating differences between the predicted echo intensity values and echo intensity values of the SAR images to be predicted; an assumed friction coefficient value corresponding to the predicted echo intensity values with a smallest difference is the friction coefficient best fit value of the SAR images to be predicted.

In addition, the present disclosure also provides a system for evaluating anti-skid performance of airport pavement based on spaceborne SAR, comprises:

SAR processing module, used for comprehensive processing of SAR images, SAR satellite precise orbit data, and data of digital elevation model, to obtain a multi-look intensity raster image with echo intensity values corresponding to scatter points.

Machine learning module, used to take objective pavement conditions, laser scanning, and friction coefficient acquired by testing tire as model inputs, and echo intensity values of SAR images measured by SAR processing module as model outputs for machine learning, to obtain a feedforward neural network model;

Anti-skid performance prediction module, used to combine the SAR images to be predicted with a series of assumed friction coefficients and input them into the feedforward neural network model, compare and select a friction coefficient best fit value, and evaluate the anti-skid performance of airport pavement based on the friction coefficient best fit value.

The beneficial effects of the present disclosure are: the method of the present disclosure obtains an echo intensity plot by processing SAR images; Establish a FNN model using machine learning algorithms that input objective conditions, surface texture parameters, measured friction coefficients, and output SAR echo intensity; Finally, input the SAR images to be predicted and the assumed friction coefficient into the FNN model, to compare and predict the anti-skid performance. The method of the present disclosure establishes a mapping relationship between spaceborne SAR echo intensity and anti-skid performance by combining spaceborne SAR data, measured anti-skid performance data, and other related factors, which can be effectively applied to evaluate the anti-skid performance of airport pavements.

The present disclosure is based on the properties of SAR echoes and establishes a correlation between SAR echo intensity and pavement friction coefficient in both temporal and spatial dimensions, enabling uninterrupted remote sensing monitoring of regional anti-skid performance over a long period and large spatial distribution.

BRIEF DESCRIPTION OF THE DRAWINGS

FIG. 1 is a flowchart of the method for evaluating anti-skid performance of airport pavement based on spaceborne SAR.

DETAILED DESCRIPTION

The present disclosure is described in detail in combination with the embodiments and attached drawings. The following embodiments are implemented on the premise of the technical scheme of the present disclosure, and the detailed implementations and specific operation processes are given. However, the scope of protection of the present disclosure is not limited to the following embodiments.

Definition

Laser texture scanning method, in the present invention, is a method of using a vehicle-mounted laser texture depth gauge to scan airport pavement and obtain data related to the texture depth of the pavement.

Friction Testing tire method, in the present invention, is a method of measuring the coefficient of friction using an apparatus with test wheel. The apparatus is usually referred to as a slippery trailer, a surface friction tester vehicle or a runway grip tester, etc., for example, similar apparatus is disclosed in the US Patent No. U.S. Pat. No. 6,928,857 B1.

Embodiment

As shown in FIG. 1, the system for evaluating anti-skid performance of airport pavement based on spaceborne SAR, comprises: SAR processing module, machine learning module and anti-skid performance prediction module. The functions of each module are as follows:

SAR processing module, used for comprehensive processing of SAR images, SAR satellite precise orbit data, and data of digital elevation model, to obtain a multi-look intensity raster image with echo intensity values corresponding to scatter points.

Machine learning module, used to take objective pavement conditions, laser scanning, and friction coefficient acquired by testing tire as model inputs, and echo intensity values of SAR images measured by SAR processing module as model outputs for machine learning, to obtain a feedforward neural network model;

Anti-skid performance prediction module, used to combine the SAR images to be predicted with a series of assumed friction coefficients and input them into the feedforward neural network model, compare and select a friction coefficient best fit value, and evaluate the anti-skid performance of airport pavement based on the friction coefficient best fit value.

The above system can be used to evaluate anti-skid performance of air-port pavement, the method is as follows:

S1. The SAR processing module obtains a multi-look intensity raster image based on Single Look Complex (SLC) images and a digital elevation model that meets accuracy requirements, and each scatter point in the multi-look intensity raster image (MLI raster) corresponds to an echo intensity value, Specifically, the steps are as follows:

Obtain SLC images and SAR precise orbit data through a SAR, and extract a common area of each one of the SLC images (Common Area, refers to the area displayed in various SLC images at the same location. Extraction requirements are based on meeting a project's needs, and the delineation of a common area is based on experience. This is an existing technology in this field. In this embodiment, a delineated common area is divided into multiple blocks based on their functions, and the type of pavement in each block is different, such as runways, taxiways, and aprons. There is no precise requirement for the boundaries of the common area), designate the pavements in common area that requires anti-skid performance evaluation as research scopes, input SAR precision orbit data, and combine it with the digital elevation model for image registration to obtain a ground echo intensity scatter plot containing geographic coding and multiple SAR acquisition times, namely a multi-look echo intensity plot. Calculate echo intensity related indicators for each scatter point one by one, the echo intensity related indicators including amplitude mean and amplitude deviation, and select the scatter points that meet preset screening conditions of amplitude mean and amplitude deviation (the preset screening conditions are empirical values, and in this embodiment, the empirical numbers are based on the empirical interval of ADI values of airport pavement (cement concrete, asphalt concrete)). Finally, the ground echo intensity scatter plot that excludes scatter points that do not meet the preset screening conditions is rasterized into a multi-look intensity raster image (MLI raster). The multi-look intensity raster image is presented in a computer and used for subsequent processing, see the following S3.

The calculation method of amplitude mean is to calculate the arithmetic mean of multiple amplitude values for multiple SAR acquisition times of a scatter point.

The calculation expression for amplitude deviation is:

$$ADI=std(X)/mean(X),$$

Wherein, X is the amplitude value, mean(X) is the amplitude mean, and std(X) is the amplitude standard deviation, which is the standard deviation of multiple amplitude values for multiple SAR acquisition times of a scatter point.

Considering the scattering characteristics of common scatterers, a scatter points selection criteria range is: $0.25 \leq ADI \leq 0.8$.

S2. Select research sites from the research scopes, confirm types of pavements of the research sites, obtain pavement material data and pavement treatment process parameters, and perform laser scanning on the pavements to obtain surface texture parameters related to a texture depth and measured friction coefficients of the pavements. Specifically, the steps are as follows:

Select research sites based on the SAR images, confirm the types of pavements at the research sites (including runway, taxiway, apron), obtain pavement material data (asphalt concrete or cement concrete) and pavement treatment process parameters (parameters of cement concrete pavement groove) for the research site;

Using laser texture scanning method to collect feature data of pavement surface texture at research sites, and calculating surface texture parameters from the feature data. Surface texture parameters include texture depth (extreme value, average value, standard deviation of research sites), average slope, and average curvature radius; And use the friction testing tire method to obtain the measured friction coefficients of the research sites.

S3. Machine learning module establishes and outputs a SAR image echo intensity feedforward neural network (FNN) model, comprising input indicators and output indicators.

Input indicators:

meteorological conditions (including cloud cover, precipitation, visibility) at the time of SAR acquisition;

types of pavements, pavement material data, pavement treatment process parameters, surface texture parameters and measured friction coefficients, obtained in S2.

output indicator: echo intensity values corresponding to the research sites in the MLI raster obtained in S1, a set of the input indicators and a set of input indicators are taken as a FNN data set, and the FNN data set is divided into a training set and a test set. The training set is machine learned to obtain a SAR image echo intensity FNN model, and the test set is used to evaluate the fitting effect of the SAR image echo intensity FNN model.

This embodiment provides a following specific process for establishing a SAR image echo intensity FNN model:

S301: Indicators encoding

The meteorological conditions for SAR acquisition refer to a meteorological aerodrome report (METAR) at the same time: cloud coverage is encoded as 0-4 according to no significant cloud or ceiling and visibility OK (NSC or CAVOK), Few clouds (FEW), scattered clouds (SCT), broken clouds (BKN), and overcast (OVC); The precipitation conditions are divided into rainfall conditions and snowfall conditions, each coded as 0-3 according to no precipitation/snow, light rain/snow, moderate rain/snow, and heavy rain/snow; Visibility is encoded by dividing the visibility value (in metric unit) in METAR by 100. For example, 6000 is encoded as 60, 500 is encoded as 5, and CAVOK or 9999 are encoded as 100 codes. The types of pavements and pavement material data of the research sites are encoded using dummy variables 0-1, where the types of pavements contain three variables, such as runway code 1/0/0, taxiway code 0/1/0, and apron code 0/0/1; One variable for pavement material data, with cement concrete encoded as 1 and asphalt concrete encoded as 0; The parameters of cement concrete pavement groove include groove width, groove depth, and groove spacing, and it does not require special coding. Surface texture parameters include texture depth (extreme value, average value, standard deviation), average slope, and average curvature radius, the surface texture parameters are directly used with the original values without encoding. Echo intensity values also do not require special encoding.

S302: SAR image echo intensity FNN Model and Training

The structure of the SAR image echo intensity FNN Model consists of three parts: input layer, hidden layer, and output layer.

The input layer includes all the input indicators in step S301, with a total of 17 nodes.

The output layer is the echo intensity values, with one node.

Set 1 hidden layer with 4 nodes.

Choose Sigmoid activation function as the activation function, whose expression is $$f(x) = \frac{1}{1+e^{-x}}$$

The backpropagation algorithm adopts AdaGrad algorithm.

S303: Evaluation of Model Fitting Effect

Since the output layer is the echo intensity values, which is a continuous variable, the root mean square error (RMSE) is used to evaluate the model fitting effect and determine the number of iterations for model learning.

$$RMSE = \sqrt{\frac{\sum_{i=1}^{n}(y_i - \hat{y}_i)^2}{n}}$$

Wherein, n is the number of observations, $y_i$ is an actual output layer indicator, and $\hat{y}_i$ is a model predicted output layer indicator. When the RMSE of the training set is stable, training is stopped, and the RMSE of the test set is calculated to evaluate the model performance. If overfitting or underfitting occurs, hyperparameters (training rounds, batch size, initial learning rate) of the model need to be adjusted and retrained.

S4. The anti-skid performance prediction module predicts the echo intensity based on the SAR image echo intensity FNN model obtained from S3, compares it numerically with the echo intensity values of SAR images to be predicted, and determines a friction coefficient best fit value. Based on the friction coefficient best fit value, the anti-skid performance of airport pavement is evaluated.

The steps of evaluating the anti-skid performance of airport pavement are as follows:

S401: assumption of friction coefficient values for prediction

Referring to Table 8.2.3 of the Technical Specification for Evaluation and Management of Civil Airport Pavement (MH/T 5024-2019), friction coefficient is divided into three categories: good, medium, and poor. Depending on the specific testing conditions of an airport, including tire type, tire pressure, and testing speed, a series of assumed friction coefficient values and corresponding assumed testing conditions are set for prediction. Assumed friction coefficient values are within the range of 0.2-0.7, and one of assumed friction coefficient values is set for every 0.02 increase.

S402: calculation of the friction coefficient best fit value

The assumed friction coefficient values in step S401, combined with the meteorological conditions of the SAR images to be predicted, are used as inputs for the SAR image echo intensity FNN model; The SAR image echo intensity FNN model outputs a predicted echo intensity value for each one of the assumed friction coefficient values;

Calculate the differences between the predicted echo intensity values and echo intensity values of the SAR images to be predicted. an assumed friction coefficient value corresponding to the predicted echo intensity values with the smallest difference is the friction coefficient best fit value of the SAR images to be predicted.

Compare the friction coefficient best fit value obtained with the measured friction coefficient obtained by the friction testing tire method to verify the accuracy of the method. After multiple verifications, the average difference between the friction coefficient best fit value calculated by the method of the present invention and the measured friction coefficient is less than 0.001.

According to Article 8.2.2 of the "MH/T 5024-2019 Technical Specification for Evaluation and Management of Civil Airport Pavement", "the anti-skid performance of the pavement should be evaluated using the pavement friction coefficient, and the depth of the pavement structure can be used as a reference basis". Therefore, the friction coefficient can directly reflect the anti-skid performance of the pavement. The present invention can ultimately evaluate the anti-skid performance of the pavement based on the most fitting value of the obtained friction coefficient.

The above description is a preferred embodiment of the present disclosure, which cannot be used to limit the scope of rights of the present disclosure. For ordinary technicians in this technical field, any modifications, equivalent substitutions and improvements made within the spirit and principles of the present disclosure should be included in the protection scope of the present disclosure.

What is claimed is:

1. A method for evaluating anti-skid performance of airport pavement based on spaceborne synthetic aperture radar, synthetic aperture radar, abbreviated as SAR, the method comprises following steps:

S1. basing on the synthetic aperture radar images and digital elevation model, obtaining a multi-look intensity raster image with echo intensity values corresponding to scatter points;

obtaining single look complex images and SAR precise orbit data through a SAR; extracting a common area and designating the research scopes; inputting SAR precision orbit data, and combining it with the digital elevation model for image registration to obtain a ground echo intensity scatter plot containing geographic coding and multiple SAR acquisition times;

calculating echo intensity related indicators for each scatter point one by one, the echo intensity related indicators comprising amplitude mean and amplitude deviation; and selecting scatter points that meet screening conditions of amplitude mean and amplitude deviation; after filtering, finally, the ground echo intensity scatter plot is rasterized into a multi-look intensity raster image, the multi-look intensity raster image is presented and used for subsequent processing;

S2. selecting research sites, and obtaining type, material, and process of research scopes corresponding to the research sites, performing laser scanning on pavements to obtain surface texture parameters related to a texture depth and measured friction coefficients;

S3. establishing and outputting a SAR image echo intensity feedforward neural network model;

setting input indicators and output indicators;

Input indicators:

meteorological conditions at the time of SAR acquisition;

types of pavements, pavement material data, pavement treatment process parameters, surface texture parameters and measured friction coefficients;

output indicator: echo intensity values corresponding to the research sites in the multi-look intensity raster image, data of the input indicators and the output indicators is divided into a training set and a test set; the training set is machine-learned to obtain the SAR image echo intensity feedforward neural network model;

S4. basing on the feedforward neural network model, predict echo intensity values are obtained and compared numerically with echo intensity values of SAR images to be predicted, in order to determine a friction coefficient best fit value; basing on the friction coefficient best fit value, the anti-skid performance of airport pavement is evaluated;

The friction coefficient best fit value is determined by the following steps:

obtaining echo intensity values of the SAR images to be predicted and corresponding meteorological conditions for SAR acquisition; setting assumed friction coefficient values;

inputting the echo intensity values of the SAR images to be predicted, the corresponding meteorological conditions, and the assumed friction coefficient values into the SAR image echo intensity feedforward neural network model to obtain predicted echo intensity values;

calculating differences between the predicted echo intensity values and echo intensity values of the SAR images to be predicted; an assumed friction coefficient value corresponding to an predicted echo intensity value with a smallest difference is the friction coefficient best fit value of the SAR images to be predicted.

2. The method of claim 1, wherein a calculation method of amplitude mean is to calculate the arithmetic mean of multiple amplitude values for multiple SAR acquisition times of a scatter point;

a calculation expression for amplitude deviation is:

$$ADI = std(X)/mean(X),$$

wherein, $mean(X)$ is the amplitude mean, and $std(X)$ is the amplitude standard deviation, which is the standard deviation of multiple amplitude values for multiple SAR acquisition times of a scatter point;

a scatter points selection criteria range is: $0.25 \leq ADI \leq 0.8$.

3. The method of claim 1, wherein step S2 comprises the following sub-steps:

selecting research sites and corresponding research scopes based on SAR images, obtain the type, material, and process of the research sites;

using a laser texture scanning method to collect feature data of pavement surface texture at research sites, and calculating relevant parameters from the feature data, the relevant parameters comprising texture depth, average slope, and average curvature radius;

using a friction testing tire method to obtain measured friction coefficients of the research scopes.

* * * * *